United States Patent
Ernohazy et al.

(10) Patent No.: US 11,218,488 B2
(45) Date of Patent: *Jan. 4, 2022

(54) ACCESS ENFORCEMENT AT A WIRELESS ACCESS POINT

(71) Applicant: Juniper Networks, Inc., Sunnyvale, CA (US)

(72) Inventors: Oscar Ernohazy, Saratoga, CA (US); Nicholas S. Dade, Santa Cruz, CA (US); Randall Wayne Frei, Los Altos, CA (US); Robert J. Friday, Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 81 days.

This patent is subject to a terminal disclaimer.

(21) Appl. No.: 16/704,656

(22) Filed: Dec. 5, 2019

(65) Prior Publication Data

US 2020/0112567 A1 Apr. 9, 2020

Related U.S. Application Data

(63) Continuation of application No. 16/118,184, filed on Aug. 30, 2018, now Pat. No. 10,581,863, which is a
(Continued)

(51) Int. Cl.
*H04L 29/06* (2006.01)
*H04W 8/00* (2009.01)
(Continued)

(52) U.S. Cl.
CPC ............ *H04L 63/102* (2013.01); *H04L 45/74* (2013.01); *H04L 63/0263* (2013.01);
(Continued)

(58) Field of Classification Search
CPC ... H04L 63/102; H04L 63/0263; H04L 63/20; H04L 63/108; H04L 45/74;
(Continued)

(56) References Cited

U.S. PATENT DOCUMENTS 6,738,909 B1* 5/2004 Cheng .................... H04L 63/12
726/3
7,653,057 B1* 1/2010 Fromm ................... H04L 47/10
370/389
(Continued)

FOREIGN PATENT DOCUMENTS

WO WO-03077477 A1 9/2003
WO WO-2017003781 A1 1/2017

OTHER PUBLICATIONS

U.S. Appl. No. 14/788,496, U.S. Pat. No. 9,686,289, filed Jun. 30, 2015, Access Enforcement at a Wireless Access Point.
(Continued)

*Primary Examiner* — Michael S McNally
(74) *Attorney, Agent, or Firm* — Shumaker & Sieffert, P.A.

(57) ABSTRACT

A first set of access rules is received from an access configuration service. The first set of access rules specifies addresses of devices authorized for a first user. A second set of access rules is received from the access configuration service. The second set of the access rules specifies addresses of devices authorized for a second user. At a wireless access point, a network packet associated with the first user is received. The first set of access rules is applied to filter the network packet.

17 Claims, 6 Drawing Sheets

Related U.S. Application Data continuation of application No. 15/496,331, filed on Apr. 25, 2017, now Pat. No. 10,091,209, which is a continuation of application No. 14/788,496, filed on Jun. 30, 2015, now Pat. No. 9,686,289.

(51) Int. Cl.

| | | |
|---|---|---|
| *H04W 12/082* | (2021.01) | |
| *H04W 12/084* | (2021.01) | |
| *H04W 12/088* | (2021.01) | |
| *H04L 12/741* | (2013.01) | |
| *H04W 48/20* | (2009.01) | |
| *H04W 84/12* | (2009.01) | |

(52) U.S. Cl.
CPC ............. *H04L 63/20* (2013.01); *H04W 8/005* (2013.01); *H04W 12/082* (2021.01); *H04W 12/084* (2021.01); *H04W 12/088* (2021.01); *H04W 48/20* (2013.01); *H04L 63/108* (2013.01); *H04W 84/12* (2013.01)

(58) Field of Classification Search
CPC ............. H04W 12/088; H04W 12/084; H04W 12/082; H04W 8/005; H04W 48/20; H04W 84/12
USPC .......................................................... 726/1
See application file for complete search history.

(56) References Cited

U.S. PATENT DOCUMENTS

| | | | |
|---|---|---|---|
| 8,683,059 B2 * | 3/2014 | Agre | H04L 63/0263 709/229 |
| 9,686,289 B2 | 6/2017 | Ernohazy et al. | |
| 10,091,209 B2 | 10/2018 | Ernohazy et al. | |
| 10,581,863 B2 | 3/2020 | Ernohazy et al. | |
| 2006/0094400 A1 | 5/2006 | Beachem et al. | |
| 2007/0110084 A1 | 5/2007 | Bennett | |
| 2008/0222044 A1 * | 9/2008 | Gottlieb | G06F 21/10 705/59 |
| 2010/0205281 A1 | 8/2010 | Porter et al. | |
| 2010/0251335 A1 * | 9/2010 | Srisuresh | H04L 63/0245 726/3 |
| 2014/0185581 A1 | 7/2014 | Senarath et al. | |
| 2014/0293829 A1 | 10/2014 | Visuri et al. | |
| 2014/0344890 A1 * | 11/2014 | Warrick | G06F 21/10 726/1 |
| 2015/0040194 A1 | 2/2015 | Chaskar et al. | |
| 2017/0006039 A1 | 1/2017 | Ernohazy et al. | |
| 2017/0230377 A1 | 8/2017 | Ernohazy et al. | |
| 2019/0020660 A1 | 1/2019 | Ernohazy et al. | |

OTHER PUBLICATIONS

U.S. Appl. No. 15/496,331, U.S. Pat. No. 10,091,209, filed Apr. 25, 2017, Access Enforcement at a Wireless Access Point.

U.S. Appl. No. 16/118,184, filed Aug. 30, 2018, Access Enforcement at a Wireless Access Point.

"U.S. Appl. No. 16/118,184, Corrected Notice of Allowability dated Dec. 19, 2019", 5 pgs.

"U.S. Appl. No. 14/788,496, 312 Amendment filed Apr. 25, 2017", 6 pgs.

"U.S. Appl. No. 14/788,496, Non Final Office Action dated Sep. 30, 2016", 10 pgs.

"U.S. Appl. No. 14/788,496, Notice of Allowance dated Feb. 2, 2017", 5 pgs.

"U.S. Appl. No. 14/788,496, PTO Response to Rule 312 Communication dated May 10, 2017", 2 pgs.

"U.S. Appl. No. 14/788,496, PTO Response to Rule 312 Communication dated May 22, 2017", 2 pgs.

"U.S. Appl. No. 14/788,496, Response filed Dec. 23, 2016 to Non Final Office Action dated Sep. 30, 2016", 7 pgs.

"U.S. Appl. No. 15/496,331, Final Office Action dated Mar. 19, 2018", 6 pgs.

"U.S. Appl. No. 15/496,331, Non Final Office Action dated Oct. 25, 2017", 9 pgs.

"U.S. Appl. No. 15/496,331, Notice of Allowance dated May 31, 2018", 9 pgs.

"U.S. Appl. No. 15/496,331, Response filed Feb. 5, 2018 to Non Final Office Action dated Oct. 25, 2017", 6 pgs.

"U.S. Appl. No. 16/118,184, Non Final Office Action dated Jul. 2, 2019", 17 pgs.

"U.S. Appl. No. 16/118,184, Notice of Allowance dated Oct. 11, 2019", 8 pgs.

"U.S. Appl. No. 16/118,184, Response filed Sep. 27, 2019 to Non-Final Office Action dated Jul. 2, 2019", 8 pgs.

"International Application Serial No. PCT/US2016/038676, International Preliminary Report on Patentability dated Jan. 11, 2018", 8 pgs.

"International Application Serial No. PCT/US2016/038676, International Search Report dated Sep. 19, 2016", 2 pgs.

"International Application Serial No. PCT/US2016/038676, Written Opinion dated Sep. 19, 2016", 6 pgs.

* cited by examiner

ACCESS ENFORCEMENT AT A WIRELESS ACCESS POINT

CROSS-REFERENCE TO OTHER APPLICATIONS

This application is a is a continuation of U.S. patent application Ser. No. 16/118,184, filed Aug. 30, 2018, which is a continuation of U.S. patent application Ser. No. 15/496,331, filed Apr. 25, 2017, which is a continuation of U.S. patent application Ser. No. 14/788,496, filed Jun. 30, 2015, all of which are incorporated herein by reference for all purposes.

BACKGROUND OF THE INVENTION

Traditionally in a wired network, devices on the same Local Area Network (i.e., LAN) are able to discover and communicate with each other. For example, devices connected to the same router are able to share files between the devices. However, in public environments such as a public hotspot, there are security issues in allowing random public clients to communicate with each other over a LAN. For example, a hacker may connect to a LAN to hack a device of another user on the LAN. Security concerns become even greater when utilizing wireless access points that allow network access without a physical connection. Due to such risks, often clients in public environments are prevented from directly communicating over a LAN. Although it may be possible to specifically reconfigure and enable a LAN when communication between clients is desired, the difficulty and manual nature of the reconfiguration often makes it extremely difficult to allow such reconfigurations. Therefore there exists a need for a more flexible and efficient way to manage access between devices of a network.

BRIEF DESCRIPTION OF THE DRAWINGS

Various embodiments of the invention are disclosed in the following detailed description and the accompanying drawings.

DETAILED DESCRIPTION

Figure 1A:
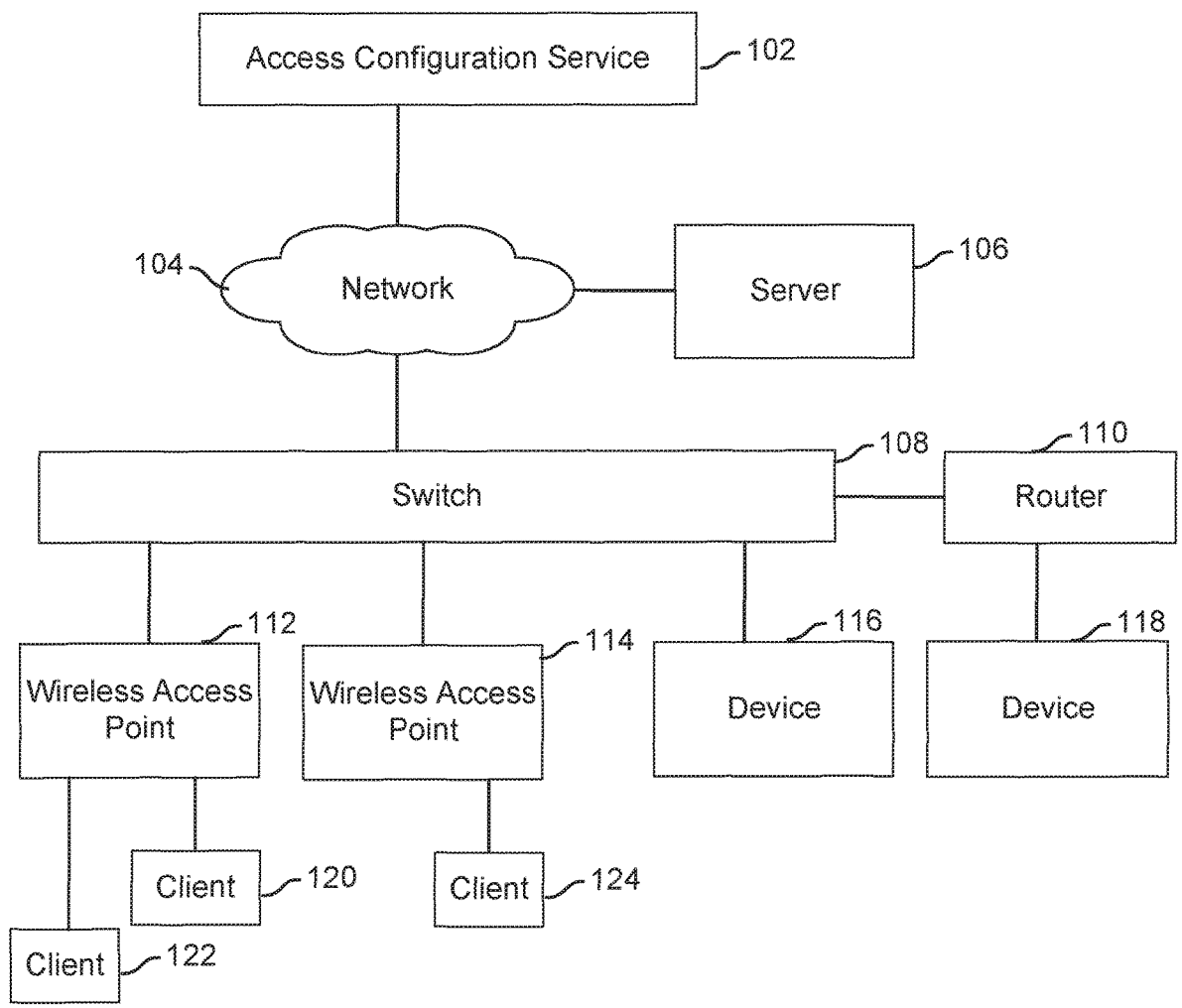
FIG. 1A is a block diagram illustrating an embodiment of a network environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Controlling access to network devices at a wireless access point (i.e., AP) is disclosed. In some embodiments, a set of access rules is received from an access configuration service. For example, when a network device establishes a connection with an AP, the AP requests and receives from a remote server access rules for a user of the particular network device. The access rules may indicate Internet Protocol (i.e., IP) and media access control (i.e., MAC) addresses allowed to be accessed by the network device and/or a destination end point of a network tunnel. The access rules for the device may dynamically change based on events defined by one or more administrators. When the conditions of an event trigger are met, updated access rules may be sent to the AP. In some embodiments, an updated set of access rules is received from the access configuration service. For example, a second network device of the user has connected to the AP and the access rules for the initial network device are updated to allow communication with the second network device of the user. When a network packet is received at the AP from the network device, the set of access rules is applied to either allow or deny the network packet. For example, the network packet is only routed to its destination if the destination is allowed by the access rules.

FIG. 1A is a block diagram illustrating an embodiment of a network environment.

A wireless access point (i.e., AP) allows one or more client devices to wirelessly connect to a network. For example, clients 120 and 122 connect to wireless access point 112 wirelessly (e.g., via Wi-Fi, IEEE 802.11x, Bluetooth, and/or other wireless standards and protocols) and access the Internet (e.g., to access webpage served by server 106) via AP 112. Any number of clients may connect to an AP. Similarly, AP 114 provides wireless network access to client 124. A single wireless network environment may include multiple APs. For example, the communication range of one AP may be insufficient to cover an entire building and multiple APs are utilized to provide wireless coverage for the building. AP 112 and AP 114 are located in the same physical environment and a client may roam between at least AP 112 and AP 114 to select the AP that offers the best wireless connection as the client moves throughout the environment. AP 112 and AP 114 may be only two of any number of APs deployed in an environment.

Examples of clients 120, 122 and 124 include a laptop computer, a desktop computer, a smartphone, a tablet computer, an Internet of Things device, a wearable computer, a wireless repeater, a wireless router, or any other wireless computer or device. In some embodiments, AP 112/114 includes and/or is included in a wired router. For example, AP 112 includes a wired Ethernet router. Switch 108 connects together AP 112, AP 114, device 116 and router 110 and routes communication between these components as well as to and from network 104. Examples of devices 116 and 118 include a networked printer, a smart television, a media player, a smart thermostat, a camera, a storage, a laptop computer, a desktop computer, a smartphone, a tablet computer, an Internet of Things device, a wearable computer, a wireless repeater, a wireless router, or any other wireless computer or device. A client of AP 112 or AP 114 may desire to access device 116 or device 118 and AP 112/114 allows automatic discovery and access of the devices by the client. Device 118 is connected to the network via router 110 and may be discoverable and accessible by clients 120, 122 and/or 124 despite being behind a router.

Access configuration service 102 includes one or more servers and/or storage (e.g., cloud) that at least manages access privileges of clients of access points. For example, when a client first establishes a connection with an AP, the AP requests and receives access rules for the client and/or a user of the client from the access configuration service. These access rules are implemented by the AP to selectively allow and disallow communication of the client. For example, the access rules for client 120 may specify that client 120 is able to communicate with the IP and MAC address of device 116 but not client 122, client 124, or router 110. In some embodiments, AP 112 facilitates a client to only discover services/devices allowed to be accessed by the client. For example, messages of network protocols such as Universal Plug and Play (i.e., UPnP) allow networked devices to automatically discover each other using discovery and advertisement messages and an AP only proxies/allows certain discovery/advertisement messages for allowed services/devices of a client to pass through and/or be stored and retransmitted. In some embodiments, AP 112/114 forwards a network traffic of a client of the AP to an alternative destination end point of a network tunnel based on one or more access rules received from access configuration server 102. For example, certain network data of a client may be forwarded to a destination that is not the originally addressed destination of the network data for compliance processing.

Examples of network 104 include one or more of the following: a direct or indirect physical communication connection, a mobile communication network, a wireless network, Internet, intranet, Local Area Network, Wide Area Network, Storage Area. Network, and any other form of connecting two or more systems, components, or storage devices together. Other communication paths may exist and the example of FIG. 1A has been simplified to illustrate the example clearly. The connections between the components shown in FIG. 1A may be a wired connection, a wireless connection, and/or software data communication paths. Although limited instances of the components shown in FIG. 1A have been shown to simplify the diagram, additional instances of any of the components shown in FIG. 1A may exist. For example, any number of APs, clients, and devices may exist. Certain standard components have been omitted to simplify the diagram. For example, any number of network switches, routers, firewalls, and network gateways may exist to facilitate the embodiments shown in FIG. 1A.

Figure 1B:
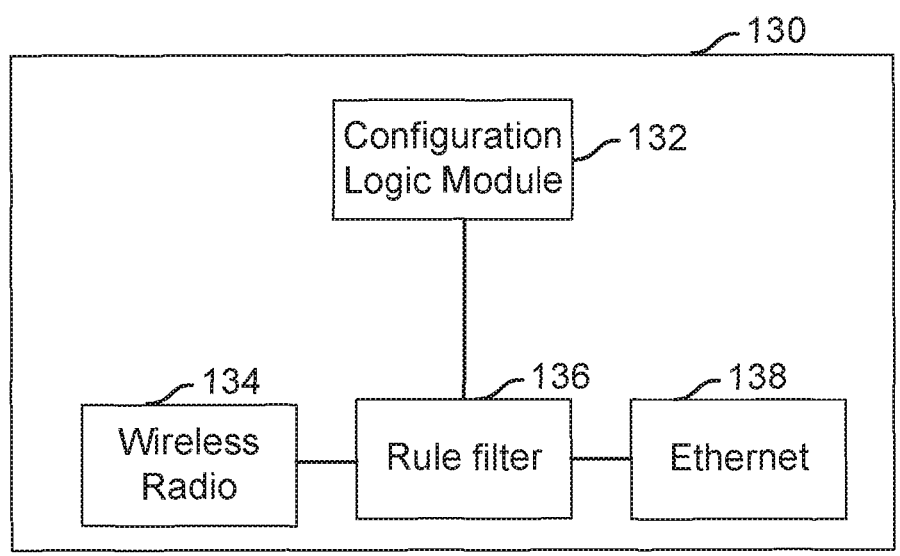
FIG. 1B is a block diagram illustrating an embodiment of a wireless access point.

FIG. 1B is a block diagram illustrating an embodiment of a wireless access point. In some embodiments, wireless access point 130 is included in wireless access point 112 and/or 114 of FIG. 1A. Wireless access point 130 includes configuration logic module 132. Logic module 132 may include one or more applications, processes, scripts and other logic to implement access filtering of the wireless access point. For example, logic module 132 requests, receives and implements access rules (e.g., access rules received from access configuration server 102 of FIG. 1A).

AP 130 includes components wireless radio 134 and Ethernet 138. The components shown in FIG. 1B may be hardware and/or software components. Wireless radio component 134 may include a wireless radio driver, integrated circuit chip and/or firmware. Ethernet component 138 may include an Ethernet controller, driver, chip and/or firmware. In some embodiments, wireless radio 134 receives communication to/from a client wirelessly and the communication is routed from/to Ethernet 138 for communication via a wired connection to a network (e.g., network 104 of FIG. 1A). Examples of wireless communication between wireless radio 134 and a client include Wi-Fi, IEEE 802.11x, Bluetooth, and/or other wireless standards and protocols.

Rule filter 136 filters communication of clients of AP 130. For example, network communication to/from wireless radio 134 and/or Ethernet 138 is filtered by rule filter 136 to allow, deny, forward and/or route based on one or more rules associated with a client of the network communication. For example, a rule of rule filter 136 is configured to forward certain network packets of a specific client to a destination of a network tunnel identified by an access rule of the client. In some embodiments, the rules of rule filter 136 are received from and/or configured by logic module 132. For example, logic module 132 receives access rules for a client from access configuration server 102 of FIG. 1A and implements the received access rules at least in part by configuring rule filter 136 to filter communication of the client using filter rules corresponding to the received access rules. Rule filter 136 may be a hardware and/or software module. For example, rule filter 136 is implemented using programmable hardware logic such as an application-specific integrated circuit (ASIC) or a field-programmable gate array (FPGA). In some embodiments, rule filter 136, wireless radio 134 and Ethernet 138 reside in software kernel space of AP 130 while logic module 132 resides in software application/user space of AP 130. Configuration logic module 132 communicates with an interface of rule filter 136 to implement access rules at the kernel level of AP 130.

Figure 2:
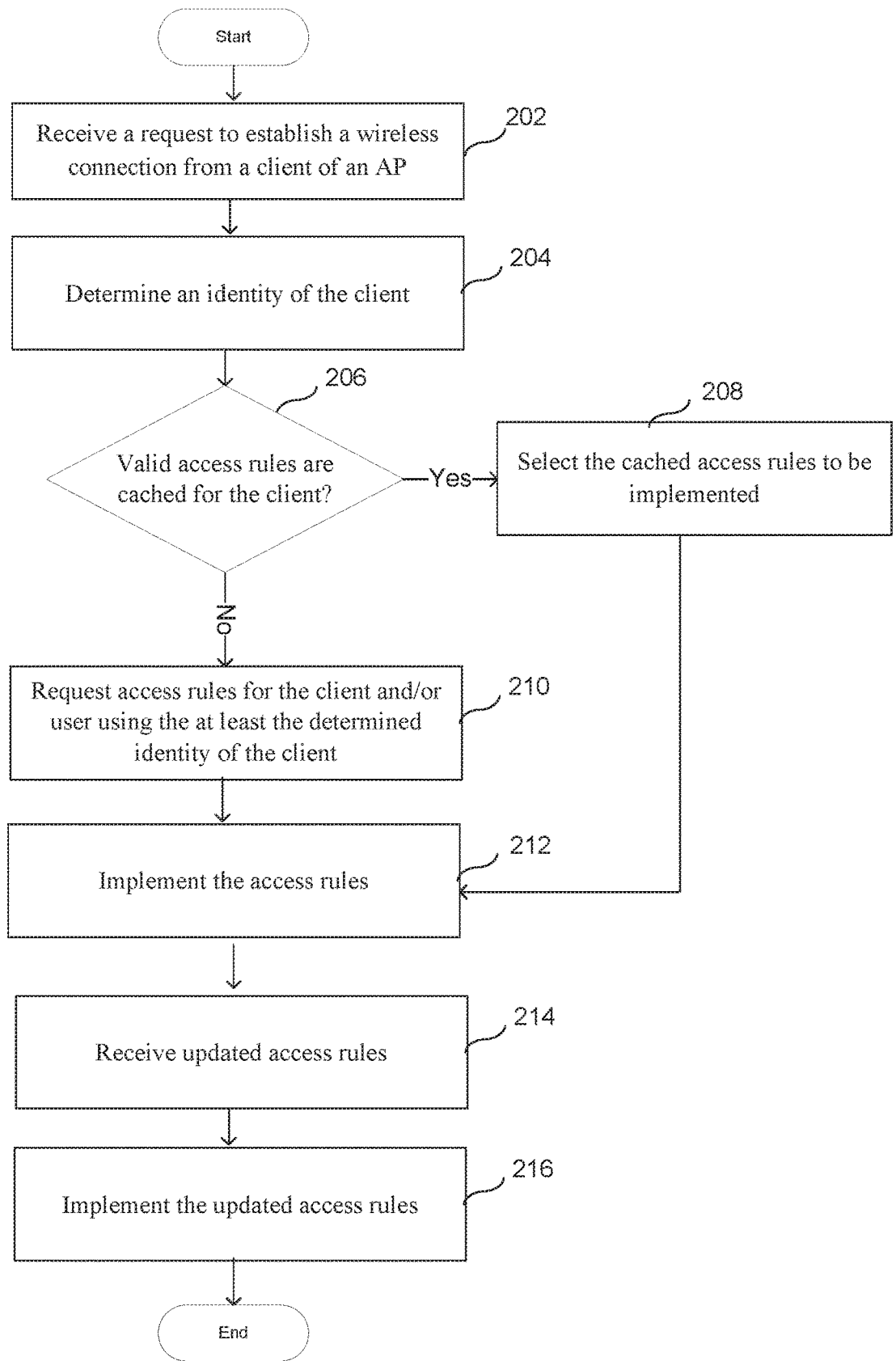
FIG. 2 is a flowchart illustrating an embodiment of a process for obtaining access rules.

FIG. 2 is a flowchart illustrating an embodiment of a process for obtaining access rules. The process of FIG. 2 may be implemented on an AP (e.g., AP 112 and/or AP 114 of FIG. 1A and/or AP 130 of FIG. 1B). In some embodiments, process of FIG. 2 is at least in part implemented by configuration logic module 132 and/or rule filter 136 of FIG. 1B.

At 202, a request to establish a wireless connection is received from a client of an AP. For example, client 120 requests to establish a Wi-Fi connection with AP 112 of FIG. 1A. In some embodiments, the request is received at the AP that has been protected by a security key. In some embodiments, the request is received at the AP that is open for access without a security key. In some embodiments, the connection is established and the client is requested to provide login credentials. For example, when a user first accesses a wireless network via a web browser, the user is prompted to log in (e.g., provide user account identifier and password), create an account, and/or provide payment for WiFi connectivity via a webpage interface.

At 204, an identity of the client is determined. In some embodiments, the identity of the client includes a MAC address of the client received from the client. In some embodiments, the identity of the client includes an identifier of a user. For example, a username and password are requested and received from the user of the client. In some embodiments, the access rules are specific to the client for a particular user. In some embodiments, the access rules for the client may be specific to a particular user and the access rules for the user is applicable and can be utilized for any device of the user.

At 206 it is determined whether valid access rules are cached for the client. For example, if the client and/or a user of the client has previously connected to the AP, the access rules of the client and/or the user may still be cached/stored by the AP. In some embodiments, the AP caches access rules of a previously connected client until at least a threshold amount of time past a time the client disconnected from the AP. In some embodiments, access rules are associated with an expiration time and access rules are invalidated past its expiration time. Prior to its expiration, the access rules may be requested and/or renewed from an access configuration service.

If at 206 it is determined that valid access rules are cached, at 208, the cached access rules are selected to be implemented.

If at 206 it is determined that valid access rules are not cached, at 210, access rules for the client and/or user are requested using the at least the determined identity of the client. In some embodiments, an automatically determined identifier of the client is provided to an access configuration service (e.g., service 102 of FIG. 1A) via a network and the access configuration service provides the access rules for the client. In some embodiments, an identifier (e.g., username, room number, user registration number, etc.) of a user of the client is requested and received from the client (e.g., via webpage) and provided to an access configuration service (e.g., along with a password) via a network to request the access rules for the client of the user. The access rules may be specific to a particular user, a particular client, or both the particular user and particular client. In some embodiments, the request identifies information about the client. For example, identifications of capabilities, operating system, resources, etc. of the client are included in the request and the access configuration service provides access rules that correspond to the provided information (e.g., access rules specific to type of device of the client). In some embodiments, requesting the access rules includes providing payment information received from the client. For example, a fee is charged to the client for network access and fee information (e.g., account number, room number, payment card information, credit card information, etc.) is received from the user via the client and provided during the request for the access configuration. The fee amount may vary according to the type, bandwidth, time, amount, and/or privileges requested for access. For example, there exists a daily Internet connection rate fee and a separate fee for the ability to access a network printer from the client. In another example, a separate fee exists for the ability to access a networked storage of media (e.g., video content).

In some embodiments, the request for the access rules includes a specification of a type, feature, device, and/or service desired to be accessed. For example, the user of the client is provided a menu of different types of options of connections, features, resources, amount of access time, level of access, settings, and peer devices available to be accessed and the user selects the desired options. The option selection may be provided in the request for access rules and the access configuration service provides access rules based on the requested options. For example, a first user may select that the user has multiple devices that the user would like to connect to a network and share data among the devices, and access rules for a client of the first user is configured to allow the client to be network accessible by other clients of the user while a second user may only have one device and access rules for a client of the second user is configured to disallow communication with other clients. In some embodiments, the access configuration service tracks the clients/devices of the user (e.g., track different devices of the user that requested access rules) and the access rules for a client have been configured to allow the client to access all known devices of the user. Various different options may be associated with different fees, requirements, and/or restrictions that must be met before the corresponding options are enabled. For example, a user that requested access to a certain device is only granted access if the account of the user is associated with a sufficient credential level.

The access configuration server provides the requested the access rules. In some embodiments, in the event certain requested options/configurations are not allowed, an error message may be received and/or access rules that do not enable the requested options/configurations are received. The received access rules may be valid for only a limited amount of time. For example, the received access rules expire after a specified amount of time and the access rules must be re-requested or renewed to extend/change its validity. In some embodiments, one or more rules among the access rules are associated with a different expiration time and/or validity time as compared to one or more other rules. For example, the access rules specify that the client is able to access a certain IP address for 24 hours while another IP is only allowed to be accessed for the next one hour. In some embodiments, the access rules limit the amount (e.g., bandwidth, storage, time period, etc.) and/or number (e.g., number of print jobs, pages, movies, media, etc.) of accesses. In some embodiments, access rules are cached. The cached rules may be removed from the cache after a specified amount of time after when the client disconnects from the AP, the client roams away from the AP, and/or the access rules' time-to-live expires. In some embodiments, an access configuration server may provide a message to instantly invalidate the access rules.

At 212, the access rules are implemented. In some embodiments, implementing the access rules includes filtering communication to/from the client using the access rules various embodiments, the access rules include a specification of whether the client is allowed and/or not allowed to utilize, access and/or receive communication using one or more of the following: one or more IP addresses, one or more MAC addresses, one or more corresponding IP and MAC address pairs, one or more network ports of one or more IP addresses, one or more network protocols, the Internet, one or more network gateways, one or more devices, one or more clients, one or more device types, one or more IP address ranges, one or more MAC address ranges, one or more port ranges, one or more network interfaces, one or more routers, and one or more switches.

In some embodiments, the access rules specify the only allowed communication parties of the client. For example, the access rules include a list of IP addresses and MAC addresses allowed to be accessed by the client and any other IP address or MAC address not specified by the access rules is not allowed to be accessed by the client. In some embodiments, the access rules specify only not allowed communication parties of the client. In some embodiments, the access rules specify a descriptive identifier of a service and/or device and implementing the rules includes determining one or more network addresses (e.g., IP address, port number, MAC address, URL, etc.) corresponding to the descriptive identifier. For example, the access rules specify that the client is allowed to access the Internet, and an AP automatically determines the address(es) of the Internet/default gateway and/or interface that corresponds to the Internet and filters the communication of the client using the determined address(es). The AP may automatically learn the address of the gateway and interface by observing network traffic (e.g., sniff DHCP packets). In some embodiments, the access rules specify logic rules associated with a specified address. For example, the access rules specify that if a packet is sent/received to/from a certain range of IP addresses, only communication utilizing certain specified ports and certain specified protocols is allowed for the client. In some embodiments, one or more of the rules are associated with a specific time limit for the rule. For example, a specific device identified by an IP/MAC address of a rule is only allowed to be accessed for a limited amount of time (e.g., rental period) while another specific device identified by an IP/MAC address of another rule is allowed to be accessed for a longer amount of time.

In some embodiments, implementing the access rules includes allowing or rejecting network packets to/from the client based on the access rules. In some embodiments, implementing the access rules includes building a flow/routing table implementing the access rules and routing packets using the flow/routing table. In some embodiments, implementing the access rules includes creating or modifying networking access control lists to implement the access rules. For example, rules are applied to IP addresses and/or port numbers specified by the access rules.

In some embodiments, implementing the access rules includes forwarding/routing network packets to/from the client based on the access rules. For example, an access rule identifies an alternative destination of a network packet to/from the client. In another example, an access rule identifies a network tunnel/tunnel end-point to be utilized to forward a rule matching network packet of the client. In some embodiments, implementing the access rules includes rerouting/redirecting network packets to/from the client based on the access rules.

At 214, updated access rules are received. In some embodiments, the access rules for a user and/or client may be dynamically modified (e.g., modified due to a network event, a detected network error, a network configuration change, a device change, a user specified change, etc.) and updated access rules are received. For example, when the user of a first client connects a second client to the AP, the access rules of the first client are dynamically updated to allow the first client to communicate with the second client. In some embodiments, the updated access rules are pushed from a remote access configuration service to the AP and the previous access rules are invalidated (e.g., entire previous set of rules invalidated or only individual rules no longer applicable invalidated). In some embodiments, the updated access rules are retrieved by the AP when the previous access rules have expired (e.g., due to expiration of time-to-live time). In some embodiments, the AP periodically checks with the access configuration service to determine whether access rules have been updated and receives the updated access rules. The updated access rules may only specify the changes from the previous access rules. The updated access rules may include the entire access rules history including the changes.

At 216, the updated access rules are implemented. In some embodiments, implementing the access rules includes filtering (e.g., reject or allow packets) network communication of the client using the updated access rules rather than the previous access rules. For example, flow/routing tables and/or access control lists are rebuilt/updated to reflect the updated access rules.

Figure 3:
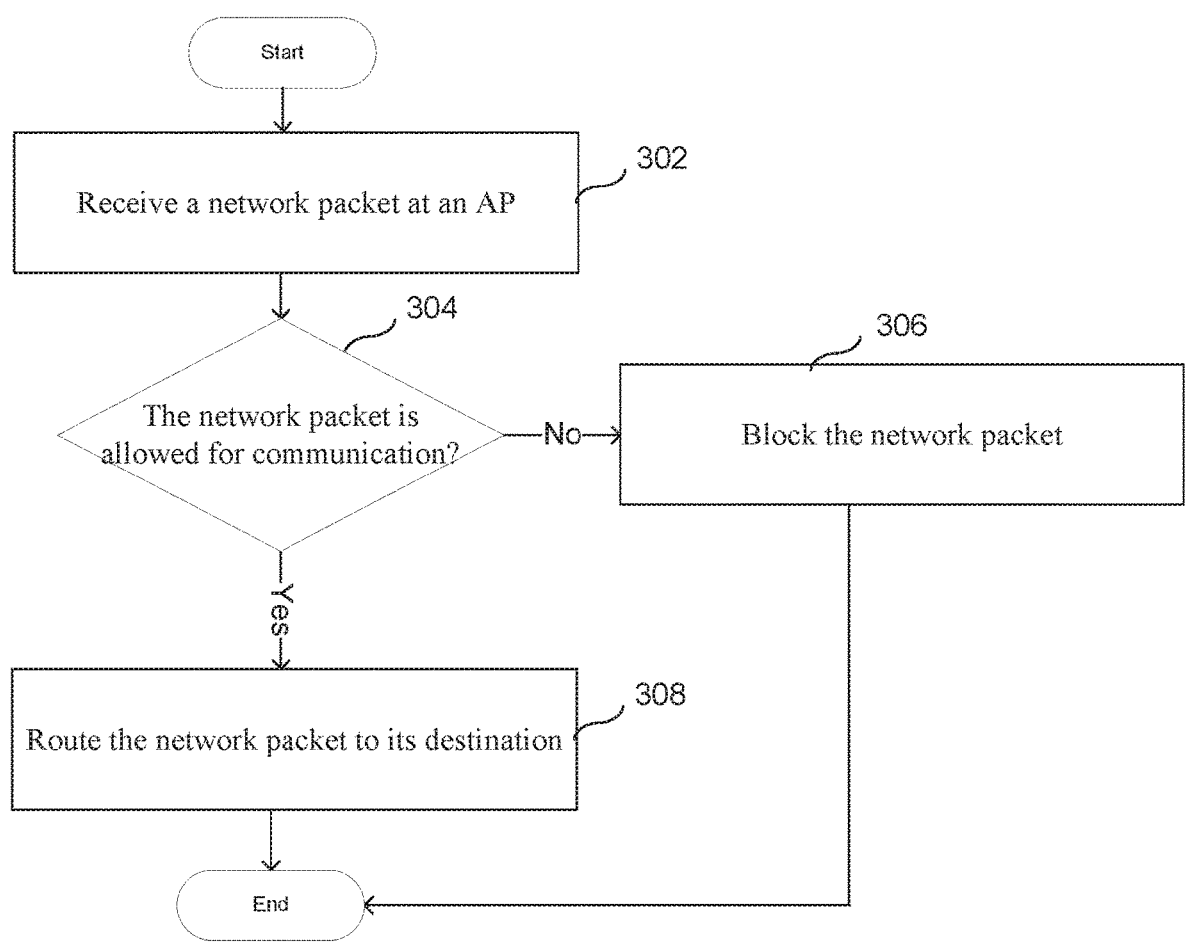
FIG. 3 is a flowchart illustrating an embodiment of a process for implementing access rules.

FIG. 3 is a flowchart illustrating an embodiment of a process for implementing access rules. The process of FIG. 3 may be implemented on an AP (e.g., AP 112 and/or AP 114 of FIG. 1A and/or AP 130 of FIG. 1B). In some embodiments, process of FIG. 3 is at least in part implemented by configuration logic module 132 and/or rule filter 136 of FIG. 1B.

In some embodiments, the process of FIG. 3 is included in 212 and/or 216 of FIG. 2. In some embodiments, the process of FIG. 3 is repeated for each received network packet of an AP.

At 302, a network packet is received at an AP. The packet may be received at the AP from a client or from a remote source for the client. In some embodiments, the client is the client of the process of FIG. 2. In some embodiments, the network packet identifies one or more of the following in addition to payload data a destination MAC address, a source MAC address, a destination IP address, a source IP address, a protocol identifier, a source port number, and a destination port number.

At 304, it is determined whether the network packet is allowed for communication. In some embodiments, determining whether the network packet is allowed includes identifying and utilizing a set of access filters corresponding to a client of the AP that is receiving/sending the network packet. For example, access filters corresponding to the client of the AP identified by the source MAC/IP address or the destination MAC/IP address are identified and utilized. In some embodiments, the network packet is to be filtered using access rules for a destination/source client of the AP identified in 208 or 210 of FIG. 2. In some embodiments, determining whether the network packet is allowed includes utilizing a flow/routing table corresponding to the access rules.

In some embodiments, determining whether the network packet is allowed includes determining whether one or more of the following of the network packet are allowed or disallowed by the access rules: a destination MAC address, a source MAC address, a destination IP address, a source IP address, a protocol identifier, a source port number, and a destination port number. For example, determining whether the network packet is allowed includes determining whether at least a source MAC address and a source IP address of the network packet received from an external source for the client (e.g., destination MAC/IP address of the packet corresponds to the client) are included in a list of IP addresses and MAC addresses allowed to be accessed by the client according to the access rule for the client. This list may be a part of the access rules and/or a flow/routing table corresponding to the access rules. In another example, determining whether the network packet is allowed includes determining whether at least a destination MAC address and a destination IP address of the network packet received from the client (e.g., source MAC/IP address corresponds to the client) are included in a list of IP addresses and MAC addresses allowed to be accessed by the client. In another example, determining whether the network packet is allowed includes determining whether the combination of the MAC address, the IP address, the port number, and the protocol of the network packet is allowed by the access rules.

In some embodiments, determining whether the network packet is allowed includes determining whether a property of the network packet is within a range specified by the access rules. In some embodiments, determining whether the network packet is allowed includes utilizing one or more global access rules (e.g., in addition to the access rules specific to a client) that are applicable to a plurality of clients of the AP (e.g., applicable to every client of the AP). For example, a global access rule specifies that if a packet is being sent by a client, the source MAC/IP address specified in the network packet must match the MAC/IP address of the client. This may be a part of a network security check. If the network packet is not allowed by a global access rule, the network packet is determined to be not allowed.

In some embodiments, determining whether the network packet is authorized includes utilizing an automatically determined parameter (e.g., automatically determined by the AP) of the access rules that is to be applied to the network packet (e.g., MAC address of a default gateway corresponding to Internet access allowed by the access rules is automatically determined by the AP by sniffing packets) and determining whether the network packet is associated with the automatically determined parameter (e.g., determine whether the network packet is destined for the address of the default gateway).

If at 304 it is determined that the network packet is not allowed, at 306, the network packet is blocked. The network packet may be dropped and not allowed to be received by the client and/or to be sent by the client. The blocked network packet may be logged for analysis and/or reporting.

If at 304 it is determined that the network packet is allowed, at 308, the network packet is routed to its destination. For example, the network packet is allowed to pass through the AP to allow the client to receive or send the network packet. In some embodiments, the allowed network packet is forwarded based on access rules/filters. For example, an access rule identifies alternative destination of the network packet to/from a client. In another example, an access rule identifies a network tunnel/tunnel end-point to be utilized to forward a rule matching network packet of the client. In some embodiments, the allowed network packet is rerouted/redirected based on access rules/filters.

Figure 4:
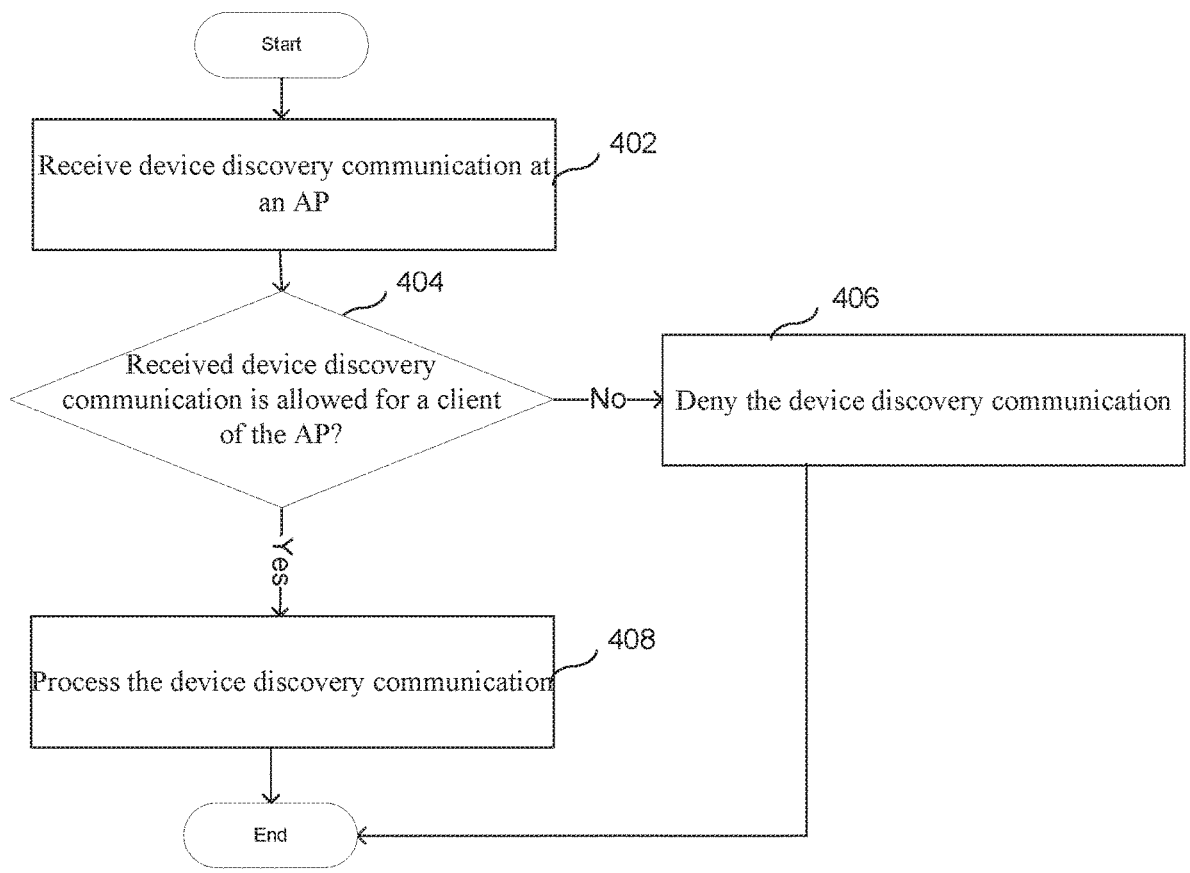
FIG. 4 is a flowchart illustrating an embodiment of a process for enabling automatic device discovery.

FIG. 4 is a flowchart illustrating an embodiment of a process for enabling automatic device discovery. The process of FIG. 4 may be implemented on an AP (e.g., AP 112 and/or AP 114 of FIG. 1A and/or AP 130 of FIG. 1B). In some embodiments, process of FIG. 4 is at least in part implemented by configuration logic module 132 and/or rule filter 136 of FIG. 1B. In some embodiments, the process of FIG. 4 is included in 212 and/or 216 of FIG. 2. In some embodiments, the process of FIG. 4 is repeated for each received service discovery communication.

Specific network protocols may allow devices to automatically discover each other to allow data sharing, communication, and service access. For example, devices on the same LAN broadcast discovery packets to allow devices on the LAN to discover each other. However, when communication between devices is filtered (e.g., using the process of FIG. 2 and/or 3) using access rules, the discovery messages from devices may be blocked and not allowed to be communicated. This may prevent devices from discovering each other despite being allowed to communicate with each other according to access rules of the devices. In some embodiments, in order to enable automatic device discovery, discovery communication is identified and separately processed to enable appropriate device discovery.

At 402, device discovery communication is received at an AP. In some embodiments, the device discovery communication is received from a client of an AP that is executing the process of FIG. 4. For example, a client of the AP has established a new wireless connection with the AP and sends a device discovery communication packet to discover peer devices that the client is able to communicate with. In another example, the AP receives a device discovery communication packet that advertises an existence of a device (e.g., availability of the device for communication) to other devices. The device discovery communication may include one or more packets of one or more of the following networking protocols: multicast Domain Name System (i.e., mDNS), Universal Plug and Play (i.e., UPnP), Bonjour, and any other device discovery protocols.

At 404, it is determined whether the received device discovery communication is allowed for a client of the AP. In some embodiments, the device discovery communication is allowed to be communicated despite being not allowed when processed using the process of FIG. 3. For example, a network communication (e.g., packet) has been specifically identified as a device discovery packet and separately processed using the process of FIG. 4. In some embodiments, the determination of 404 is performed for each client of the AP that is to receive the device discovery communication.

In some embodiments, the client is the client that provided the device discovery communication and it is determined whether the client is allowed to send the device communication to one or more intended destinations of the discovery communication. For example, access rules of the client obtained in 208 or 210 of FIG. 2 for the client are utilized to determine whether the client is allowed to communicate with the intended device destination(s) of the device discovery communication. In the event the client is allowed to communicate with the intended device destination(s) of the device discovery communication, the received device discovery communication is determined to be allowed, and in the event the client is not allowed to communicate with the intended device destination(s) of the device discovery communication, the received device discovery communication is determined to be not allowed.

However in some cases, the discovery communication is intended to be sent one or more device destinations that may not be known. For example, the discovery communication is to be broadcasted to all devices able to receive the communication. In another case, the discovery communication is intended to be sent to a plurality of device destinations and the client is only allowed to communicate to a subset of the intended destinations. In some embodiments, the discovery communication is modified to be only communicated to one or more destinations that are allowed according to access rules of the client sending the device discovery communication. For example, a destination of the discovery communication is modified to be only specifically addressed to the allowed device(s). In some embodiments, if at least one intended destination of the discovery communication is not allowed, the entire discovery communication is identified as not allowed. In some embodiments, if at least one intended destination of the discovery communication is allowed, the entire discovery communication is identified as allowed.

In some embodiments, the client is the intended destination of the device discovery communication. For example, a remote device is responding to a previous discovery request or is broadcasting its availability and the client is the intended destination of this communication. In some embodiments, it is determined whether the client is able to communicate with the sender of the device communication. For example, access rules of the client identified in 208 or 210 of FIG. 2 for the client are utilized to determine whether the client is allowed to communicate with the source of the device discovery communication. In the event the client is allowed to communicate with the source of the device discovery communication, the received device discovery communication is determined to be allowed, and in the event the client is not allowed to communicate with the source of the device discovery communication, the received device discovery communication is determined to be not allowed.

If at 404 it is determined that the received device discovery communication is not allowed for the particular client, at 406, the device discovery communication is denied. The device discovery communication may be dropped and not allowed to be received by the client and/or sent by the client. The denied device discovery communication may be logged for analysis and/or reporting. In some embodiments, denying the device discovery communication includes modifying the device discovery communication to be only addressed to destinations allowed by access rules of the client.

If at 404 it is determined that the received device discovery communication is allowed for the particular client, at 408, the device discovery communication is processed. In some embodiments, the processing the device discovery communication includes proxying/allowing/routing the device discovery communication to pass through the AP to allow the client to receive or send the discovery communication. In some embodiments, the device discovery communication is modified prior to being sent/received (e.g., destination modified based on access rules of the client).

In some embodiments, the processing of the device discovery communication includes storing/caching at least a portion of the device discovery communication. For example, an advertisement device discovery communication of a remote device is stored to be provided later to a new client of the AP to allow the new client to discover the remote device at a later time (e.g., when the new client connects to the AP and the new client is allowed to communicate with the remote device as identified by access rules of the new client). In some embodiments, processing the device discovery communication includes generating/providing one or more responses to the discovery communication without sending the device discovery communication to other devices. For example, the device discovery communication includes a request to discover devices available for communication and responses indicating devices available for communication are replayed by the AP from its cache. Generating the responses may include providing a previously stored message from a device that advertises the availability of the device for communication. Although these response communications may seem to the recipient client that the response communications were dynamically provided by remote devices advertising their availability, the response communications were actually generated and provided by the AP.

A list of potentially discoverable devices may be automatically determined by the AP. For example, the AP receives and stores device information of discovery advertisement packets from the potentially discoverable devices. In another example, the AP tracks the clients connected to the AP and the clients of the AP are included in the potentially discoverable devices. In some embodiments, potentially discoverable devices include one or more user indicated devices and/or services. For example, a network administrator has specifically specified one or more specific devices/services as potentially discoverable. A discoverable device may be behind a separate router than a router of the AP. For example, traditionally only devices behind the same router (e.g., within the same LAN) are discoverable. However, by allowing the AP to respond to device discovery requests, the AP may allow its clients to discover specified devices at any network location, including devices connected to other remote routers.

Figure 5:
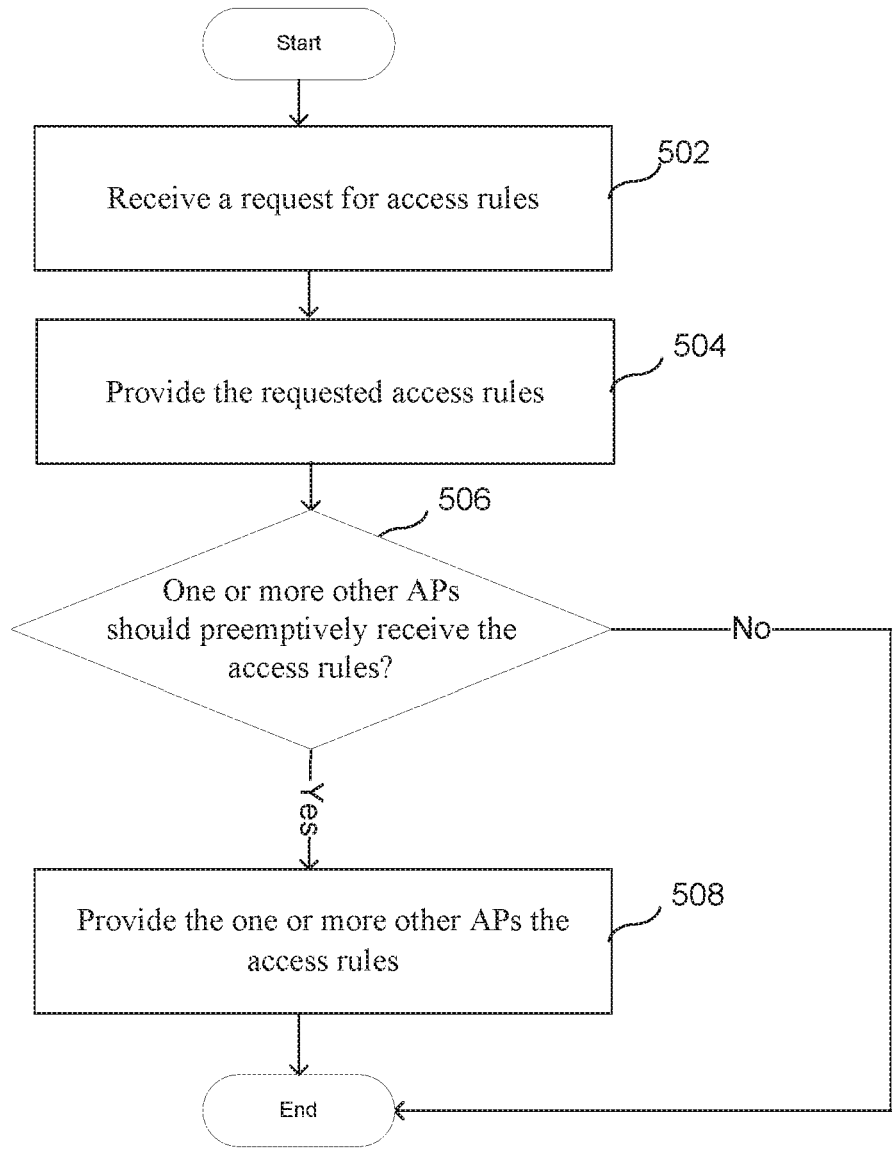
FIG. 5 is a flowchart illustrating an embodiment of a process for responding to a request for access rules.

FIG. 5 is a flowchart illustrating an embodiment of a process for responding to a request for access rules. The process of FIG. 5 may be implemented by one or more servers of a service (e.g., access configuration service 102 of FIG. 1A). In some embodiments, the process of FIG. 5 is repeated for each received request for an access rule.

At 502, a request for access rules is received. In some embodiments, the request is the request provided in 210 of FIG. 2. In some embodiments, the request identifies a user (e.g., user identifier) and/or a client device (e.g., MAC address of the device) and access rules corresponding to the identified user and/or client are determined. In some embodiments, the access rules are dynamically generated. For example, the access rules have been configured to allow communication between all currently network-connected devices that requested access rules using the same user account. In some embodiments, a record of the request is stored. For example, an identifier of a time when the request was generated/received and an identifier of an AP that provided the request are stored with an identifier of the user and/or client of the request.

At 504, requested access rules are provided. In some embodiments, the provided access rules are received at 210 of FIG. 2 by an AP that provided the request of 502.

At 506, it is determined whether one or more other APs should preemptively receive the access rules in addition to the AP that requested the access rules. For example, the client of the requested access rules may be physically in motion and may roam from one AP to another AP to seek an AP that can provide a stronger wireless signal to the client as the client moves in physical space. Because requesting, receiving, and processing access rules may take a relatively large amount of time, the client may experience a long delay while the access rules of the client are requested, received, and processed by the new AP after roaming to a new AP before the client is able to access a network. In some embodiments, by anticipating that the client is likely to connect to a new AP, the new AP is provided access rules for the client prior to the client requesting a connection to the new AP to enable the new AP to receive, cache, and/or process the access rules in anticipation of the client.

In some embodiments, determining whether the one or more other APs should also receive the access rules includes analyzing a history/sequence of access rule requests for the particular client (e.g., a history/sequence of records stored in 502) and determining a probability that the client will migrate to another AP. If the probability is greater than a threshold value, one or more other APs are provided the access rules of the client. In some embodiments, the probability is associated with whether the client has connected to different APs within the latest threshold time period. For example, if the client has migrated APs within the last five minutes, the client is likely in motion and likely will migrate to another adjacent AP. The AP(s) that are to preemptively receive the access rules may be all physically adjacent APs within a physical vicinity (e.g., within a threshold distance)

of a physical location of the current AP of the client. In some embodiments, by analyzing a sequence/historical pattern of general client migration patterns between APs, APs likely to be the target of a migration from the current AP are identified and provided the access rules of the client. In some embodiments, by analyzing a historical AP migration/AP connection pattern for the specific client, one or more APs likely to be the target of a migration from the current AP are identified and provided the access rules for the client. For example, by determining the physical direction corresponding to the one or more latest AP migrations of the client, the likely direction of travel of the client is determined and utilized to identify any new AP(s) in the determined direction that are to preemptively receive the access rules for caching and processing.

If at 506, it is determined that one or more other APs should preemptively receive the access rules, at 508, the one or more other APs are provided the access rules. These one or more other APs may cache and/or process the access rules for identification in 208 of FIG. 2. If at 506, it is determined that one or more other APs should not preemptively receive the access rules, the process ends.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A wireless access point system, comprising:
hardware processing circuitry;
one or more hardware memories storing instructions that when executed configure the hardware processing circuitry to perform operations comprising:
receiving an access rule specifying a device authorized for access by a source;
receiving a packet;
determining the packet is from the source; and
routing the packet according to the access rule based on the determination,
wherein the packet is addressed to a second device, and wherein the routing of the packet comprises determining, based on the access rule, that the second device is not permitted for access by the source, and dropping the packet in response to the determination.

2. The system of claim 1, wherein the access rule specifies a plurality of devices authorized for access by the source, and wherein the packet is addressed to a second device of the plurality of devices, and routing the packet according to the access rule comprises forwarding the packet to the second device based on the access rule.

3. The system of claim 1, wherein the access rule specifies the device is authorized for access by specifying an Internet Protocol or MAC addresses of the device.

4. The system of claim 1, the operations further comprising receiving a device identifier, and requesting access rules for the device identifier from a server, wherein the receiving of the access rules is in response to the requesting.

5. The system of claim 1, the operations further comprising receiving an updated access rule indicating an additional device authorized for access by the source.

6. The system of claim 1, the operations further comprising generating one or more messages advertising the device authorized for access by the first source.

7. A wireless access point system, comprising:
hardware processing circuitry;
one or more hardware memories storing instructions that when executed configure the hardware processing circuitry to perform operations comprising:
receiving an access rule specifying a device authorized for access by a source;
receiving a packet;
determining the packet is from the source; and
routing the packet according to the access rule based on the determination,
wherein the packet is addressed to a second device, and wherein the routing of the packet comprises determining, based on the access rule, that the second device is permitted for access by the source, and forwarding the packet to the second device based on the determination.

8. A non-transitory computer readable storage medium comprising instructions that when executed by hardware processing circuitry, configure the hardware processing circuitry to perform operations comprising:
receiving, by an access point, an access rule specifying a device authorized for access by a source;
receiving, by the access point, a packet;
determining, by the access point, the packet is from the source; and
routing, by the access point, the packet according to the access rule based on the determination,
wherein the packet is addressed to a second device, and wherein the routing of the packet comprises determining, based on the access rule, that the second device is not permitted for access by the source, and dropping the packet in response to the determination.

9. The non-transitory computer readable storage medium of claim 8, wherein the access rule specifies a plurality of devices authorized for access by the source, and wherein the packet is addressed to a second device of the plurality of devices, and routing the packet according to the access rule comprises forwarding the packet to the second device based on the access rule.

10. The non-transitory computer readable storage medium of claim 8, wherein the access rule specifies the device is authorized for access by specifying an Internet Protocol or MAC addresses of the device.

11. The non-transitory computer readable storage medium of claim 8, the operations further comprising receiving a device identifier, and requesting access rules for the device identifier from a server, wherein the receiving of the access rules is in response to the requesting.

12. The non-transitory computer readable storage medium of claim 8, the operations further comprising receiving an updated access rule indicating an additional device authorized for access by the source.

13. The non-transitory computer readable storage medium of claim 8, the operations further comprising generating one or more messages advertising the device authorized for access by the first source.

14. A non-transitory computer readable storage medium comprising instructions that when executed by hardware processing circuitry, configure the hardware processing circuitry to perform operations comprising:
receiving, by an access point, an access rule specifying a device authorized for access by a source;
receiving, by the access point, a packet determining, by the access point, the packet is from the source; and
routing, by the access point, the packet according to the access rule based on the determination,
wherein the packet is addressed to a second device, and wherein the routing of the packet comprises determining, based on the access rule, that the second device is permitted for access by the source, and forwarding the packet to the second device based on the determination.

15. A method, comprising:

receiving, by an access point, an access rule specifying a device authorized for access by a source;

receiving, by the access point, a packet;

determining, by the access point, the packet is from the source;

routing, by the access point, the packet according to the access rule based on the determination; and generating one or more messages advertising the device authorized for access by the source.

16. The method of claim 8, wherein the access rule specifies a plurality of devices authorized for access by the source, and wherein the packet is addressed to a second device of the plurality of devices, and routing the packet according to the access rule comprises forwarding the packet to the second device based on the access rule.

17. The method of claim 8, further comprising receiving a device identifier, and requesting access rules for the device identifier from a server, wherein the receiving of the access rules is in response to the requesting.

* * * * *